May 21, 1929.  S. C. CARNEY  1,713,888
METHOD OF REFRIGERATION
Filed Oct. 28, 1925
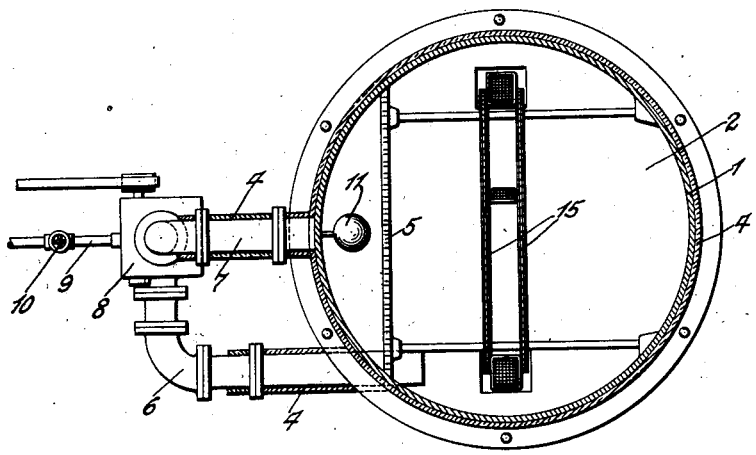
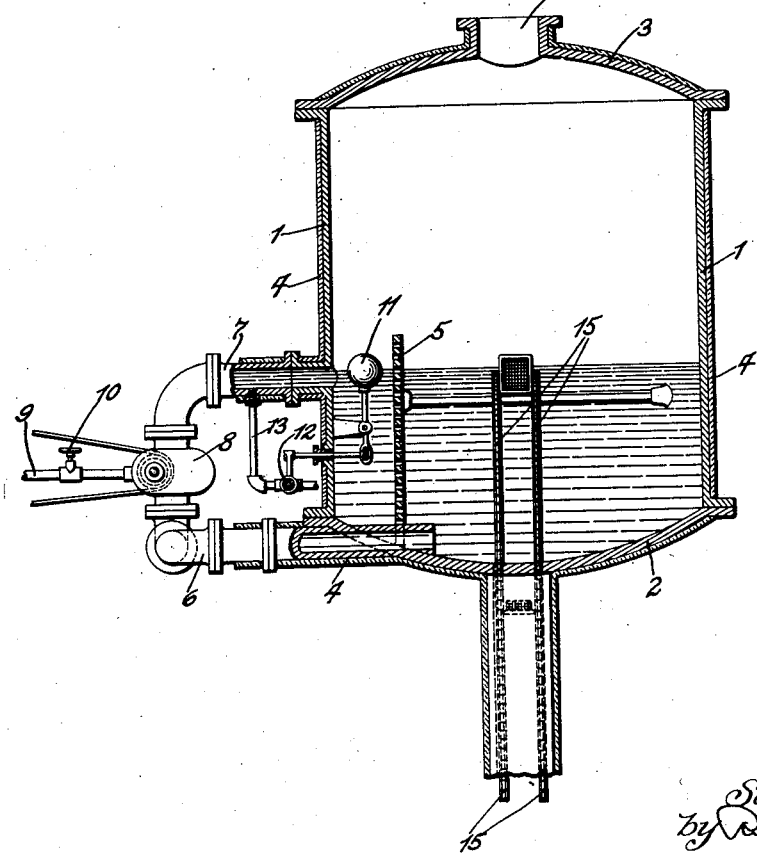
Inventor:
Samuel C. Carney,
His Attorneys Patented May 21, 1929.

1,713,888

UNITED STATES PATENT OFFICE.

SAMUEL C. CARNEY, OF TULSA, OKLAHOMA, ASSIGNOR TO SHELL PETROLEUM CORPORATION, A CORPORATION OF VIRGINIA.

METHOD OF REFRIGERATION.

Application filed October 28, 1925. Serial No. 65,346.

This invention relates to a method of refrigeration.

It has been determined that hydrocarbon mixtures comprising blends of propane, ethane or other similar light hydrocarbons, when liquefied and expanded directly in water or in certain other liquids, for example, heavy petroleum products used as lubricants, the liquid may be partially frozen or congealed and that the frozen or congealed bodies may be withdrawn from the excess liquid.

It has also been determined that when a hydrocarbon refrigerant of the character mentioned are mixed with water, preferably in the presence of a partial vacuum, it is only very slightly soluble in the water, even at a temperature of approximately 32° F., and that the small amount of absorption by water of such hydrocarbons, particularly when pure, impart practically no taste or odor to the ice and are not deleterious or harmful, so that ice for commercial purposes may be frozen in this manner.

It is an object of the invention to provide a method whereby a hydrocarbon refrigerant of the general character mentioned in a liquid state may be mixed with water or other suitable liquid in a chamber and thereby freeze the liquid.

In the drawing there is illustrated a form of apparatus suitable for carrying out the method of the invention, although it will be understood that the invention may be practiced in various other ways.

By reference to the following disclosure, taken in connection with the accompanying drawing, the advantages as well as the additional applications of the process may be readily understood.

In the drawing, Fig. 1 is a plan view of the apparatus, and Fig. 2 is a vertical section through the apparatus.

The apparatus comprises a chamber preferably having a cylindrical side wall 1, a convex bottom 2, and a concave head 3 forming together an air tight container. The chamber and the pipes connected thereinto are preferably insulated by a covering 4 of any suitable insulating material. Within the chamber and running transversely near one side thereof is a perforated partition 5. This partition 5 extends upwardly from the bottom wall of the chamber to a point above the normal liquid level maintained in the tank.

It is desirable that means be provided to create a partial vacuum in the chamber 1 and the best results are obtained at an absolute pressure of five pounds, or less, when the process is used for making ice.

An inlet pipe 6 enters the bottom of the chamber, the opening of the pipe being disposed inwardly of the partition 5, and an overflow pipe 7 enters the chamber 1 at a point spaced upwardly from the bottom of the chamber. A suction pump 8 withdraws the liquid through the pipe 7 and discharges it into the bottom of the chamber through the pipe 6. The pipe 6 is arranged so that the flow of liquid from the pipe strikes the circular inner wall of the chamber 1 at a tangent, thereby imparting to the liquid in the chamber a rotary motion, the effect of which is to drive the frozen or congealed bodies of the liquid toward the center of the chamber.

The hydrocarbon refrigerant is supplied to the bottom chamber through a supply passage 9 controlled by a valve 10, where it is directly mixed with the incoming liquid and discharged with it into the chamber through the pipe 6. The apparatus is adjusted so that at all times there will be a substantial excess of the liquid in the chamber 1, and so that the liquid level will be maintained approximately uniform at the point illustrated in Fig. 2 of the drawing. This is accomplished by a liquid level device 11 connected with a valve 12 in a supply pipe 13 through which the water or other liquid is supplied directly to the pipe 7 to replace the liquid in frozen state that is withdrawn from the chamber 1.

It will be understood that the mixture of the liquid hydrocarbon and the liquid to be frozen when introduced into the chamber 1, in which a partial vacuum is preferably maintained, results in the evaporation of the refrigerant while it is submerged in the liquid and that, as a result, a reevaporation takes place, the frozen particles or bodies of the liquid rising to the top of the liquid level of the excess liquid in the chamber.

The partition wall 5 acts as a baffle to prevent the frozen bodies from clogging the throat of the pipe 7, so that there may be a free flow of the excess liquid through the pipe for re-treatment.

By properly balancing the pressure in the chamber 1 substantially all of the refrigerant may be evaporated in the presence of the liquid. Whatever unevaporated refrigerant there may be while it remains in the liquid state will float on the excess liquid and will be withdrawn through the pipe 7, thereby preventing any waste of the refrigerant and obtaining the full refrigerating effect thereof.

The incoming mixture of the refrigerant and liquid is prevented from freezing and clogging the inlet pipe 6 by the excess of the liquid and also by the action of the pump. Any part of the refrigerant that vaporizes after passing through the liquid is trapped in and withdrawn from the upper part of the chamber 1 through the outlet passage 14, through which it may be introduced into any suitable recovery system, it being understood that the outlet 14 is connected with the recovery system to make the interior of the chamber air tight so that a partial vacuum may be maintained during the operation of the apparatus.

The frozen bodies of the liquid, after accumulating upon the top of the excess liquid in the chamber 1 and being forced to the central part of the chamber through the whirling action of the liquid, are continuously withdrawn by a conveyor system 15, a portion of which is illustrated in the drawing, said conveyor system being more fully illustrated and described in my copending application Serial No. 59,796.

It is obvious that the foregoing process provides a continuous method for the production of ice and other frozen bodies, and that by withdrawing the separate bodies from the chamber through suitable compression apparatus, cakes of ice or other congealed liquids may be made in commercial form.

When the process is used to congeal liquids other than water, for example, lubricating oils or the like, it is desirable that a brine solution or other liquid of low freezing point, which will not mix with the oil, should be used to supply the excessive liquid in the chamber 1. The congealed bodies of the liquid under treatment will rise to the level of this carrying liquid, from which they may be withdrawn in the manner above described.

It is desirable to carry on the refrigeration of the liquids in the presence of a partial vacuum in the chamber 1, particularly where the process is used in the manufacture of ice, for the reason that the reduced pressure reduces the solubility of the refrigerant in the water. Moreover, the reduced pressure permits a certain evaporation of the water in the chamber augmenting the refrigerating action. It will be understood, however, that the maintenance of a pressure below atmospheric will not in all cases be necessary and the pressure may be varied to some extent dependent upon the liquid under treatment.

It is obvious also that the method may be carried on economically as the entire effect of the expanding hydrocarbon refrigerant is utilized.

I am aware that the invention may be modified in certain particulars without departure from the spirit and scope thereof. I do not limit myself unessentially, but what I claim and desire to secure by Letters Patent is:—

1. A method of freezing liquids, which includes supplying a mixture of liquid hydrocarbon to an excess of liquid to be frozen in a chamber, maintaining a partial vacuum in said chamber, evaporating a part of the hydrocarbon liquid, withdrawing the unevaporated liquid refrigerant from the chamber, and drawing the frozen bodies of the liquid from the excess of liquid in the chamber.

2. The method of freezing liquids, which consists in supplying a mixture of liquid hydrocarbon to an excess of liquid to be frozen in a chamber, maintaining a partial vacuum in said chamber, evaporating a part of the hydrocarbon liquid, withdrawing the unevaporated liquid refrigerant from the chamber, withdrawing the frozen bodies from the excess of liquid in the chamber, and separately withdrawing the vapor of the refrigerant from the chamber.

3. A method of refrigeration which consists in maintaining in a chamber a body of liquid to be frozen, withdrawing and returning the liquid below the liquid level maintained in the chamber, supplying to the returning liquid a quantity of liquid refrigerant, evaporating the liquid refrigerant from the mixture so formed to freeze a portion of the liquid, and withdrawing the frozen portion of the liquid from the chamber.

4. A method of refrigeration which consists in supplying a quantity of liquid to be frozen to a chamber, injecting a mixture of refrigerant and liquid below the level of the liquid in the chamber, evaporating the liquid refrigerant from the mixture so formed to freeze a portion of the liquid, and withdrawing the frozen portion of the liquid from the chamber.

5. A continuous method of making ice which consists in supplying a quantity of water to a closed chamber, maintaining a feed below the water level of the water in the chamber, said feed including a mixture of water and a refrigerant, evaporating the refrigerant, and withdrawing the frozen bodies of ice from the excess of water in the chamber.

6. A continuous method of making ice which consists in supplying a quantity of water to a closed chamber, maintaining a feed below the water level of the water in the chamber, said feed including a refrigerant liquid, evaporating the refrigerant, and withdrawing the frozen bodies of ice from the excess of water in the chamber.

SAMUEL C. CARNEY.